(12) United States Patent
Göltenboth

(10) Patent No.: US 12,414,648 B2
(45) Date of Patent: Sep. 16, 2025

(54) BEVERAGE MAKER AND METHOD FOR PREPARING AT LEAST ONE BEVERAGE

(71) Applicant: WMF GmbH, Geislingen/Steige (DE)

(72) Inventor: Frank Göltenboth, Senden (DE)

(73) Assignee: WMF GmbH, Geislingen/Steige (DE)

( * ) Notice: Subject to any disclaimer, the term of this patent is extended or adjusted under 35 U.S.C. 154(b) by 249 days.

(21) Appl. No.: 17/767,579

(22) PCT Filed: Oct. 6, 2020

(86) PCT No.: PCT/EP2020/077981
§ 371 (c)(1),
(2) Date: Apr. 8, 2022

(87) PCT Pub. No.: WO2021/069430
PCT Pub. Date: Apr. 15, 2021

(65) Prior Publication Data
US 2024/0099498 A1   Mar. 28, 2024

(30) Foreign Application Priority Data
Oct. 11, 2019 (DE) ............ 10 2019 215 649.5

(51) Int. Cl.
*A47J 31/44* (2006.01)
*B67D 1/00* (2006.01)
*B67D 1/08* (2006.01)

(52) U.S. Cl.
CPC ......... *A47J 31/4425* (2013.01); *B67D 1/0041* (2013.01); *B67D 1/0894* (2013.01)

(58) Field of Classification Search
CPC ............ A47J 31/4428; A47J 31/4425; A47J 31/4432; A47J 31/4414; B67D 1/0041; B67D 1/0894
See application file for complete search history.

(56) References Cited

U.S. PATENT DOCUMENTS

| | | | |
|---|---|---|---|
| 10,239,742 B2* | 3/2019 | Dresser | B67D 1/1236 |
| 10,689,240 B1* | 6/2020 | Schultz | B67D 1/0064 |
| 2013/0282164 A1* | 10/2013 | Veloo | G07F 13/10 |
| | | | 700/218 |

FOREIGN PATENT DOCUMENTS

| | | |
|---|---|---|
| CH | 573736 | 3/1976 |
| CN | 105530843 A | 4/2016 |

(Continued)

OTHER PUBLICATIONS

Office Action for Taiwan Patent Application No. 109134829 dated Dec. 8, 2022 (6 pp.).

(Continued)

*Primary Examiner* — Reginald Alexander
(74) *Attorney, Agent, or Firm* — Crowell & Moring LLP

(57) ABSTRACT

A beverage maker is provided that comprises a unit for preparing a beverage, a beverage spout, a display unit, a control unit, and a turntable having a plurality of sectors. The display unit is configured to show the turntable and a current position of the sectors of the turntable. The control unit is configured to prompt the display unit to show a beverage container that is suitable for an at least one selected beverage in an outer sector of the turntable after the selection of at least one beverage by a user and to prompt the turntable to rotate after a command to prepare the at least one selected beverage such that the outer sector adopts the position of the dispensing sector of the turntable. The display unit is prompted by the control unit to show the change of the position of the turntable and of the beverage container.

13 Claims, 1 Drawing Sheet

(56) References Cited

FOREIGN PATENT DOCUMENTS

| DE | 10 2006 060 748 B3 | | 1/2008 | | |
|----|----|----|----|----|----|
| DE | 102013104714 A1 | * | 11/2014 | .......... | A47J 31/4407 |
| DE | 10 2016 213 173 A1 | | 1/2018 | | |
| DE | 20 2016 213 173 A1 | | 1/2018 | | |
| DE | 202018101556 U1 | * | 8/2019 | | |
| WO | WO 02/089074 A2 | | 2/2002 | | |

OTHER PUBLICATIONS

Office Action for European Patent Application No. 20786544.5 dated Mar. 13, 2023 (6 pp.).
International Search Report and Written Opinion regarding PCT/EP2020/07798 dated Dec. 14, 2020.

* cited by examiner

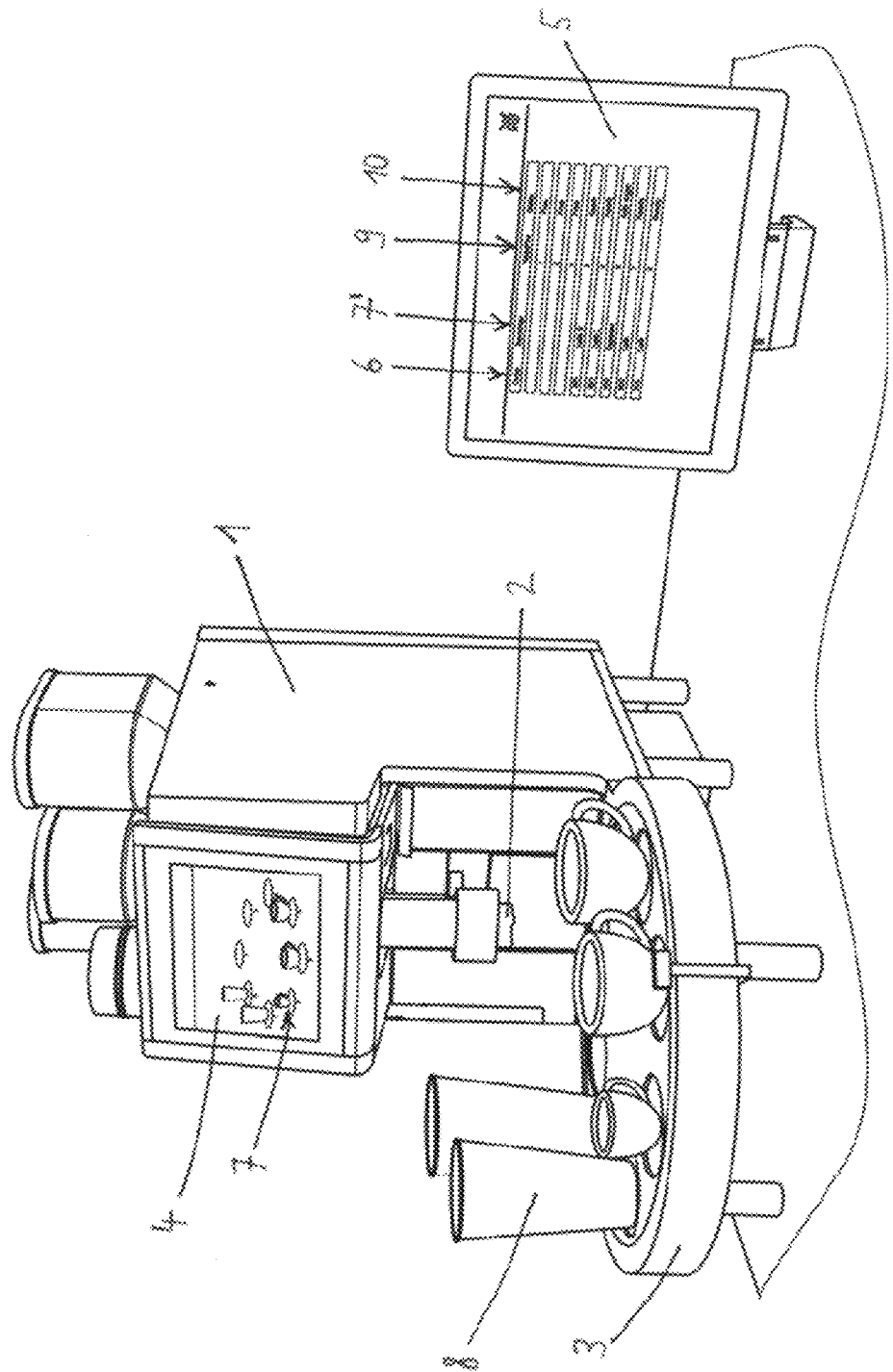

BEVERAGE MAKER AND METHOD FOR PREPARING AT LEAST ONE BEVERAGE

CROSS-REFERENCE TO RELATED APPLICATIONS

This application is a 371 nationalization of international patent application PCT/EP2020/077981 filed Oct. 6, 2020, which claims priority under 35 USC § 119 to German patent application DE 10 2019 215 649.5 filed Oct. 11, 2019 entire contents of each of the above-identified applications are hereby incorporated by reference.

BRIEF DESCRIPTION OF THE DRAWINGS

FIG. 1 shows a schematic representation of a beverage maker.

DETAILED DESCRIPTION

A beverage maker is provided that comprises a unit for preparing at least one beverage, a beverage spout, a display unit, a control unit, and a turntable having a plurality of sectors. The display unit is configured to show the turntable and a current position of the sectors of the turntable. The control unit is configured to prompt the display unit to show a beverage container that is suitable for an at least one selected beverage in an outer sector of the turntable after the selection of at least one beverage by a user and to prompt the turntable to rotate after a command to prepare the at least one selected beverage such that the outer sector adopts the position of the dispensing sector of the turntable. In addition, the display unit is prompted by the control unit to show the change of the position of the turntable and of the beverage container and prompts the beverage maker to prepare the at least one selected beverage by the unit and to dispense it via the beverage spout into the beverage container located in the dispensing sector. A corresponding method of preparing at least one beverage is presented.

DE 10 2006 060 748 B3 discloses a beverage dispensing machine for the preparation of a plurality of beverage portions in cups, wherein the beverage dispensing machine has a removable and rotatable cup receiving plate on which the cups can be placed and can be consecutively filled with the beverage. This beverage dispensing machine has the disadvantage, however, that the user only has the names of the respective beverages displayed after programming a specific order of preparing beverages on the control panel of the beverage dispensing machine. A user thus requires a certain time to consider which respective beverage container can be considered for the respective name of a beverage. This delays the dispensing of a beverage and thus the speed at which a beverage or a plurality of beverages can be dispensed via the beverage maker. The consideration on the part of a user is moreover associated with a certain susceptibility to error since the user selects an incorrect (i.e. an unsuitable or inappropriate) beverage container in certain situations and places it on the cup receiving plate and thus "blocks" the dispensing or forces an incorrect dispensing. These problems are much more considerable with inexperienced users than with experienced users.

DE 10 2016 213 173 A1 discloses a beverage vending machine that includes an input unit for detecting a request of a first and a second beverage, wherein a first drinking vessel is associated with the first beverage and a second drinking vessel is associated with the second beverage and the beverages and their drinking vessels differ from one another. A dispenser for delivering the first or second beverage, a moving device, and a control device are furthermore provided at the beverage vending machine. The beverage vending machine furthermore comprises a tray for a plurality of drinking vessels, wherein the moving device is adapted to move the tray and the dispenser with respect to one another. The beverage vending machine moreover has a first dispensing device that provides a visual indication (e.g. a text or a symbol) of an empty drinking vessel that is to be arranged on the tray. However, this beverage vending machine has the disadvantage that the user requires a certain time to consider which respective beverage container is meant by the shown visual indication (e.g. the text shown or the symbol shown). Confusion and incorrect operations can result, for example, due to the low information content of a symbolic representation. This delays the dispensing of a beverage and thus the speed at which a beverage or a plurality of beverages can be dispensed via the beverage maker since the tray with an incorrect (i.e. an unsuitable or inappropriate) beverage container is "blocked" or an incorrect dispensing is forced. The problem described is much more considerable with inexperienced users than with experienced users.

DE 20 2018 101 556 U1 discloses a machine for the preparation of brewed beverages comprising at least one brewing unit for producing a brewed beverage and at least one spout for dispensing the brewed beverage into a drinking vessel, wherein a turntable is provided for transporting at least one drinking vessel relative to the spout, whereby the drinking vessel transport can take place automatically by the machine and the number of required user interventions can be reduced. The machine permits a sequential dispensing of brewed beverages, wherein the dispensing takes place either automatically after a specific drinking vessel has been recognized by the machine via a sensor or takes place triggered manually after a dispensing command was entered by a user via an operating unit of the machine (e.g. a combined rotary knob with push button function). The disadvantage of the automatic dispensing is that when the turntable is equipped with an incorrect drinking vessel, an incorrect (i.e. unwanted) brewed beverage is dispensed. The dispensing of the correct (i.e. desired) beverage and thus the speed at which the correct beverage can be dispensed via the machine is thus delayed since an incorrect brewed beverage dispensing is forced. On the manually triggered dispensing of beverages, the known problem results that the user has to know which drinking vessel is to be considered for the selected beverage (i.e. suitable or inappropriate) before entering a command to dispense a specific beverage. The user requires a certain time for this, which delays the dispensing of a beverage and thus the speed at which the beverages can be dispensed via the beverage maker. The problem described is much more considerable with inexperienced users than with experienced users.

The beverage maker may, in particular, enable a preparation of beverages in the correct (i.e. suitable or appropriate) beverage container that is less susceptible to error and that is faster (above all with inexperienced users). A method of preparing at least one beverage should furthermore be presented by which a preparation of beverages in the correct beverage containers is possible that is less susceptible to error and that is faster.

A beverage maker is provided comprising
a) a unit for preparing at least one beverage;
b) a beverage spout that is fluidically connected to the unit;

c) a turntable having a plurality of sectors for placing down at least one beverage container, wherein the turntable has a dispensing sector arranged below the beverage spout and at least one outer sector;
d) a display unit; and
e) a control unit,
characterized in that
the display unit is configured to show the turntable and a current position of the sectors of the turntable, and
the control unit is configured
to prompt the display unit to show a beverage container that is suitable for the at least one selected beverage in an outer sector of the turntable after a selection of at least one beverage at the beverage maker by a user; and
to prompt the turntable to rotate after a command to prepare the at least one selected beverage such that the outer sector adopts the position of the dispensing sector; to prompt the display unit to show the change of the position of the turntable and of the beverage container; and to prompt the beverage maker to prepare the at least one selected beverage by the unit and to dispense it via the beverage spout into the beverage container located in the dispensing sector.

The beverage maker in accordance with the invention enables a preparation of beverages in the correct beverage container that is less susceptible to error and is faster. The reason for this is that a user of the beverage maker no longer has to consider which beverage container is the right beverage container for which selected beverage. The required association of selected beverage with the required beverage container is here performed by the beverage maker itself and the beverage maker shows the respective beverage container required for a selected beverage via its display unit. The user can thus see directly on the display unit of the beverage maker which beverage container or containers he has to provide on the turntable of the beverage maker. Unnecessary consideration time for the user is thus dispensed with. The operation of the beverage maker therefore becomes simpler and faster for the user and the susceptibility to operating errors is reduced. Consequently, beverages (that are e.g. intended for preparation in a job list of beverages) can be provided in a simpler and faster manner this is freer of error than with known beverage makers.

The beverage maker in accordance with the invention can be characterized in that the control unit is configured to prompt the display unit to show a beverage container that is suitable for a respectively selected beverage in a respective one outer sector of the turntable after a selection of at least two, preferably at least three, particularly preferably at least four, very particularly preferably at least five, in particular at least six, beverages by a user, optionally after a selection up to a maximum number of beverages that can be shown in the outer sectors of the turntable. The more beverages are selected, the greater the above-described advantage of the beverage maker in accordance with the invention for the user since the more beverage containers that have to be provided on the turntable, the more time is taken up with beverage makers from the prior art to find the correct beverage container and the greater the susceptibility to making an error in the selection here. This is prevented by the beverage maker in accordance with the invention.

The control unit can be configured to prompt the turntable to rotate such that the respective outer sectors consecutively adopt the position of the dispensing sector after a command to prepare the at least two, preferably at least three, particularly preferably at least four, very particularly preferably at least five, in particular at least six, selected beverages, optionally after a selection of a maximum number of beverages that can be shown in the outer sectors of the turntable, and to prompt the display unit to show the changes to the positions of the beverage containers, and to prompt the beverage maker to prepare the selected beverages consecutively by the unit and to dispense them via the beverage spout into the respective beverage container located in the dispensing sector. In this embodiment, a list of beverages (a so-called job list) is prepared sequentially, i.e. consecutively, by the beverage maker, with the user being able to track the sequential preparation in real time on the display unit of the beverage maker. If necessary, the user can also still replace a beverage container in an outer sector of the turntable during the sequential preparation if he recognizes it as incorrect, i.e. if he recognizes that the beverage container placed in the outer sector on the turntable does not correspond to the required beverage container shown on the display unit of the beverage maker. A recognition of an incorrect beverage container during the preparation is in contrast made more difficult in known beverage makers since they do not show the required beverage containers on their display units.

The display unit of the beverage maker and/or an operating unit connected to the beverage maker in a wireless or wired manner can be configured to transmit a selection of at least one beverage by a user to the control unit. The selection is preferably made possible via a display of the at least one beverage by means of a representation selected from the group comprising text, symbol, pictogram, and combinations hereof.

It is furthermore preferred that the selection is made possible by touching the at least one beverage and/or by dragging the at least one beverage into a selection zone of the display unit and/or operating unit. The control unit is preferably configured to show the beverages next to one another in the selection zone on the display unit and/or operating unit in the event of a selection of a plurality of beverages, with the selection zone particularly preferably being a representation of the turntable. The control unit is very particularly preferably configured to show the beverages on continuous outer sectors of the turntable located next to one another, in particular starting with the outer sector that is located directly next to the dispensing sector. The transfer of the selection via the operating unit separate from the display unit has the advantage that the entry of a desired beverage can also take place at a point that is far distant from the beverage maker (e.g. a cash register in a restaurant or café). The selection by the dragging of the beverage into a selection zone has the advantage that different job lists can be prepared in a fast manner and a prepared job list can be processed fast (e.g. the preparation order of the beverages can be changed fast). These advantages in particular result when the selection zone comprises or consists of the presentation of the turntable on the display unit.

It is moreover preferred that the selection is made possible by touching the at least one beverage and by dragging the at least one beverage in a selection zone of the display unit and/or operating unit to change the position of the at least one beverage in the selection zone, with the selection zone particularly preferably being a representation of the turntable and the control unit very particularly preferably being configured no longer to show the beverage in the first outer sector of the turntable after touching and dragging a beverage from a first outer sector into a second outer sector of the turntable and to show it in the second outer sector of the turntable. This has the advantage that an existing job list can be changed in a fast manner, i.e. the preparation order of the beverages can be changed fast. The change of the preparation order directly on the shown turntable has the advantage that the user directly carries out a change of an order of shown beverage containers on the shown turntable instead of a change of an order of beverages in a beverage list and the attention of the user is thus already on the beverage containers required for the preparation of the beverages and on their placement on the turntable. The actual placement of the required beverage containers can thus be carried out even faster for the user.

The display unit of the beverage maker and/or an operating unit connected to the beverage maker in a wireless or wired manner can be configured to accept an order number of at least one beverage by a user and to transfer it to the control unit.

Furthermore, the display unit of the beverage maker and/or an operating unit connected to the beverage maker in a wireless or wired manner can be configured to show a selection of at least one beverage by a user, preferably together with an order number associated with the at least one beverage. The representation preferably takes place in a sector of the turntable in which the beverage container for the at least one beverage is located on the turntable of the beverage maker and/or in which the beverage container for the at least one beverage is shown on the turntable displayed on the display unit. The control unit is here preferably configured to prompt the presentation of the order number on the turntable of the beverage maker and/or on the turntable displayed on the display unit. The advantage of the presentation of the order number with the associated beverage container is that it becomes very easy for the user to recognize the beverage containers covered by a specific order number and to take it from the turntable very fast. If the user does not consume the beverages himself, he can thus also very quickly take them to a consumer who had ordered the beverages under the order number. A decisive advantage of the beverage maker in accordance with the invention also results here: Since the order number is directly associated with a beverage container, the user does not first have to consider which beverage container on the turntable now corresponds to a beverage of the order number. If, for example, a cappuccino is located on the display of a cash register or of a cash register receipt under a specific order number, the user (here: a waitperson of a restaurant or café) does not have to consider which cup that he can see on the turntable is now a cappuccino cup or perhaps a different cup. He can simply take the cup at which the order number is displayed since it is the correct cappuccino cup in this respect. Orders via order numbers can thus be worked through considerably simpler, faster, and freer of error.

In addition, the display unit of the beverage maker and/or an operating unit connected to the beverage maker in a wireless or wired manner can be configured to show the selected beverages in a list, preferably together with an order number associated with the beverages, in the event of a selection of a plurality of beverages by a user, with the list particularly preferably fixing the order of a preparation of the selected beverages and with the order in particular being changeable by an entry of the user. This configuration has the advantage that a user can quickly intervene in the preparation order in a job list. This is of advantage when the wish for a faster provision of individual beverages of the job list (e.g. by a customer of a restaurant or café) is only required after the taking of an order. This wish can thus be met simply and fast.

The display unit of the beverage maker and/or an operating unit connected to the beverage maker in a wireless or wired manner can be configured to display a status of the dispensing sector and/or of at least one outer sector of the turntable, with the status preferably being selected via a representation selected from the group comprising text, symbol, pictogram, color, and combinations hereof. The status of the dispensing sector and/or of at least one outer sector is particularly preferably selected from the group comprising i) required, but missing beverage container;
ii) incorrect beverage container;
iii) correct and empty beverage container in which the preparation has not yet started;
iv) correct beverage container in which the preparation has started;
v) correct beverage container filled with beverage and still incomplete beverage preparation; and
vi) correct beverage container filled with beverage and completed beverage preparation.

The advantage of the status display is that an additional visual signal that informs a user of the status of a beverage during a preparation process is provided to the user in addition to the display of the turntable with its individual sectors and the beverage container to be placed on the turntable. The user can thus recognize even faster whether he has to become active for the provision of the completed beverage (relates to status i), ii), and v)) or whether he no longer has to become active (relates to status iii) and vi)). This visual information permits the user to operate the beverage maker faster, simpler, and in a manner freer of error. The user, for example, receives the information through the visual information of status iii) or iv) that he initially does not have to do anything, i.e. he can use his time for other work since the beverage maker will require a specific time to fill the correct beverage container with the selected beverage. The operation is thus more economical.

The status i) (required, but missing beverage container in the dispensing sector and/or outer sector) can, for example, be displayed via a color representation, preferably a flashing blue representation. The color representation can be selected from the group comprising text, pictogram, illuminated field, and combinations hereof and is in particular a flashing blue circle below the beverage container shown as suitable.

The status ii) (incorrect beverage container in the dispensing sector and/or outer sector) can, for example, be displayed via a color representation, preferably a flashing red representation. The color representation can be selected from the group comprising text, pictogram, illuminated field, and combinations hereof and is in particular a flashing red circle below the beverage container shown as suitable.

The status iii) (correct and empty beverage container in the dispensing sector and/or outer sector in which the preparation has not yet started) can, for example, be displayed via a color representation, preferably a blue representation. The color representation can be selected from the group comprising text, pictogram, illuminated field, and combinations hereof and is in particular a blue circle below the beverage container shown as suitable.

The status iv) (correct beverage container in the dispensing sector and/or outer sector in which the preparation has started) can, for example, be displayed via a color representation, preferably a red representation. The color representation can be selected from the group comprising text, pictogram, illuminated field, and combinations hereof and is in particular a red circle below the beverage container shown as suitable The status v) (correct beverage container filled with beverage in the dispensing sector and/or outer sector and still incomplete beverage preparation) can, for example, be displayed via a color representation, preferably a yellow representation. The color representation can be selected from the group comprising text, pictogram, illuminated field, and combinations hereof and is in particular a yellow circle below the beverage container shown as suitable.

The status vi) (correct beverage container filled with beverage in the dispensing sector and/or outer sector and completed beverage preparation) can, for example, be displayed via a color representation, preferably a green representation. The color representation can be selected from the group comprising text, pictogram, illuminated field, and combinations hereof and is in particular a green circle below the beverage container shown as suitable.

The display unit of the beverage maker and/or an operating unit connected to the beverage maker in a wireless or wired manner can be configured to accept a command to prepare the at least one selected beverage by a user, preferably by touching a representation, particularly preferably via a representation selected from the group comprising text, symbol, pictogram, and combinations hereof, and to transmit the command to prepare the at least one selected drink to the control unit. In this embodiment, the preparation command is entered manually by the user, which gives the user more control over the start time of the preparation.

The display unit of the beverage maker and/or an operating unit connected to the beverage maker in a wireless or wired manner can furthermore be configured to enable an entry by a user, to no longer show a beverage container shown in the outer sector or dispensing sector via the display unit and/or operating unit, and to transmit a made entry to the control unit, with the entry preferably being made possible via a representation, in particular a representation selected from the group comprising text, symbol, pictogram, and combinations hereof. Alternatively or additionally to this, the control unit can be configured to receive signals from at least one sensor at the turntable (e.g. a weight sensor) and to decide on the basis of the signal whether a beverage container shown in the outer sector or dispensing sector will continue to be shown via the display unit and/or operating unit or not. This embodiment describes variants of the masking of beverage containers after they have been filled by the beverage maker (i.e. e.g. have left the dispensing sector and are now in an outer sector of the turntable) and have then been removed from the turntable of the beverage maker by the user. The entry (feedback) of the removal of the prepared beverage can take place manually by the user (e.g. by tapping the corresponding beverage container on the display unit) or it can take place automatically by the beverage maker (e.g. via a sensor that detects the removal of the filled beverage container from the turntable).

The sectors of the turntable of the beverage maker can comprise at least one sensor for detecting a placed down beverage container, with the at least one sensor having a communicative connection to the control unit. The at least one sector is preferably selected from the group comprising a weight sensor, optical sensor, magnetic sensor, electromagnetic sensor, imaging sensor, and combinations hereof, particularly preferably selected from the group comprising a weight sensor, optical sensor, and combinations hereof. The at least one sensor is in particular a weight sensor. A recognition of a beverage container (e.g. a cup recognition) can, for example, take place via a weight sensor (e.g. a load cell). A distinction can generally also be made via such a weight sensor between respective empty and full beverage containers so that the weight sensor can transmit feedback on a successful dispensing of beverage to the control unit of the beverage maker. A removal of a filled beverage maker from the turntable can furthermore be transmitted to the control unit. In addition, an incorrect beverage container placed down on the turntable can be detected, this information can be communicated to the control unit. In the event of an incorrect beverage container (e.g. an incorrect cup) on a sector of the turntable, a warning can be output to a user of the beverage maker by the beverage maker so that the user can quickly make a correction, i.e. a replacement of the incorrect beverage container with the correct beverage container.

The control unit can be configured to control the turntable such that a predefined order of the beverage preparation is observed after a recognition of at least two swapped over beverage containers on at least two outer sectors of the turntable (e.g. via at least one sensor in the outer sectors). For this purpose, for example, an outer sector (that incorrectly contains the beverage container for the first beverage to be prepared) that is further remote from the reference sector can be traveled (i.e. rotated) to the dispensing sector first and an originally closer outer sector (that incorrectly contains the beverage container for the second beverage to be prepared) can be traveled (i.e. rotated) to the dispensing sector. This configuration of the control unit can apply accordingly to a plurality of swapped over beverage containers on the outer sectors of the turntable. The advantage of this variant is that an error of a user Is corrected if the correct beverage container (e.g. for the working through of a job list) were admittedly placed on the turntable, but their order was swapped over so that the preparation order (e.g. fixed in a job list) would not be correct. The correction can be corrected faster by a direct control of the turntable than a manual correction of the order by a user, which makes the beverage dispensing faster and more pleasant for the user and provides the user with more time for other work.

The control unit can furthermore be configured (e.g. in an alternative setting) to adapt the job list in accordance with the order of at least two swapped over beverage containers after a recognition of at least two swapped over beverage containers on at least two outer sectors of the turntable (e.g. via at least one sensor in the outer sectors). The advantage here would be that the speed of the filling of the beverage containers on the turntable can be worked through faster by the beverage maker since the turntable has to move a minimal distance. This variant can be advantageous when a large number of beverages of different order numbers have to be provided in a time that is as short as possible and when the order of the preparation of individual order numbers falls in importance over the speed of the preparation of all the beverages of the different order numbers.

In a preferred embodiment, the control unit is configured, when the at least one sensor does not detect any beverage container or detects an unsuitable beverage container in the outer sector, not to prompt the turntable to rotate after receipt of a command to prepare the at least one selected beverage such that the outer sector adopts the position of the dispensing sensor. This embodiment can protect the beverage maker from dispensing a certain beverage in an incorrect order and can thus save time and resources.

In a further preferred embodiment, the control unit is configured, when the at least one sensor detects a suitable beverage container in the outer sector, not to prompt the turntable to rotate after receipt of a command to prepare the at least one selected beverage such that the outer sector adopts the position of the dispensing sensor. This control can optionally also take place in the absence of a command entered by a user to prepare the at least one selected beverage, i.e. the command to prepare the at least one selected beverage is here generated by the control unit itself (i.e. automatically) as soon as a suitable beverage container has been placed on an outer sector provided for the beverage container. The advantage here is that a manual command no longer has to be given by the user to start the preparation. As soon as the at least one sensor (or a plurality of sensors) registers (or register) that the correct beverage container (or containers) has/have been placed on the turntable, the preparation starts. The user thus has more time available since he is relieved of giving the start command.

The sectors of the turntable of the beverage maker can (each) have a grate that is suitable for placing down beverage containers, with a drip tray preferably being arranged beneath the grate. The advantage here is that liquid that exits the beverage maker or that accidentally at least partly exits the beverage spout next to the beverage container passes through the grate and is collected. No contamination of the surroundings of the beverage maker with this liquid thus occurs since it remains in the beverage maker (i.e. is collected from the turntable).

The sectors of the turntable of the beverage maker can furthermore (each) comprise a sector display unit that is configured to display information on each sector. The display preferably takes place via a representation selected from the group comprising text, symbol, pictogram, color, and combinations hereof. The displayed information in particular corresponds to at least one piece of information (i.e. a status) of a respective sector that is displayed via the display unit of the beverage maker and/or of an operating unit connected to the beverage maker in a wireless or wired manner. The advantage of this embodiment is that the user receives information on the status of a respective sector at the turntable itself, i.e. a glance at the turntable is sufficient to see whether something still has to be done or not. This makes the operation of the beverage maker simpler, faster, and less susceptible to error.

The unit for preparing at least one beverage can be a unit for preparing at least one beverage selected from the group comprising coffee, tea, milk, milk froth, and combinations hereof. The unit for preparing at least one beverage is preferably selected from the group comprising the brewing unit, the milk frother, and combinations hereof. The beverage maker is in particular a coffee maker ("bean to cup coffee maker").

The beverage spout of the beverage maker can be movable in the direction of the turntable. The advantage here is that the beverage spout can be moved to just above the rim of a beverage container before the dispensing of a beverage. The risk is hereby reduced that beverage splashes are produced on the dispensing that exit the interior of the beverage container.

The display unit and/or an operating unit connected to the beverage maker in a wireless or wired manner can comprise or consist of a touch-sensitive screen. The touch-sensitive screen ("touchscreen") has the advantage that it is not only a display unit, but also an operating unit, i.e. cannot only present information, but can also accept commands from a user and can forward them to the control unit.

A method of preparing at least one beverage is furthermore presented comprising the steps
a) After selecting at least one beverage at a beverage maker by a user:
prompting a display unit of the beverage maker to show a beverage container that is suitable for the at least one selected beverage in an outer sector of a turntable of the beverage maker that is displayed by the display unit.
b) After a command to prepare the at least one selected beverage:
prompting the turntable to rotate such that the outer sector of the turntable adopts a position of a dispensing sector of the turntable, with the dispensing sector of the turntable being arranged beneath a beverage spout of the beverage maker;
prompting the display unit to show the change of the position of the turntable and of the beverage maker;
prompting the beverage maker to prepare the at least one selected beverage by a unit of the beverage maker and to dispense it into the beverage container present in the dispensing sector via a beverage spout fluidically connected to the unit,
wherein the steps in a) and b) are prompted by a control unit of the beverage maker.

The method in accordance with the invention can be characterized in that a beverage maker in accordance with the invention is used in the method.

The subject matter in accordance with the invention will be explained in more detail with reference to the following FIGURES and examples without intending to restrict it to the specific embodiments shown here.

The FIGURE shows a schematic representation of a beverage maker 1 in accordance with the invention. The beverage maker 1 comprises a unit for preparing at least one beverage (unit is not shown, here e.g. a brewing unit for preparing coffee), a beverage spout 2 that is fluidically connected to the unit, and a turntable 3 having a plurality of sectors for placing down at least one beverage container 8 (division of the sectors is not shown here). The turntable 3 has eight spaces for one respective beverage container 8 per space and thus eight sectors for one respective beverage container 8 per sector. Each of the eight sectors extends radially outwardly from the geometrical center of the turntable 3 and provides a placement surface for a respective one individual beverage container 8. The turntable 3 has a dispensing sector arranged beneath the beverage spout 2 and has seven outer sectors in this case (sectors to the left and right of the dispensing sector). The beverage maker 1 furthermore has a display unit 4 and a control unit (not shown). The beverage maker 1 shown here moreover comprises an operating unit 5 on which inter alia a selection and a representation of at least one beverage 7' can take place under an associated order number 6 (e.g. by touching the operating unit 5). A beverage 7' selected at the operating unit 5 can also be shown as the selected beverage 7 on the display unit 4. A selected beverage 7, 7' can additionally be deselected again or changed to a different beverage 7, 7' at the operating unit 5 and/or display unit 4 (e.g. by touching the display unit 4). The operating unit 5 is in communicative connection with the beverage maker 1 and is thus a part of the beverage maker 1. The operating unit 5 can moreover display the position number 9 and the status 10 of every sector of the turntable 3.

Example 1—Use of a Beverage Maker in Accordance with the Invention

A user of the beverage maker can prepare a job list of beverages that should be sequentially produced by the beverage maker via the display unit that is here configured as a touchscreen and that also acts as an operating unit. This job list can be displayed in a screen region of the touchscreen. The display unit of the beverage maker furthermore shows the beverage containers required for the production of the beverages in the preparation order in the outer sectors of the turntable visualized by the display unit.

The user (e.g. a waitperson) can then see the beverage containers required to work through the job list visualized directly on the display unit of the beverage maker and thus no longer has to consider how the respective required beverage containers for the working through of the job list look. He can very quickly and reliably see by a quick visual comparison of his beverage containers placed down on the turntable with the required beverage containers shown on the display unit whether he has made a mistake or whether the correct beverage containers were positioned. He can now give a command to prepare the beverages via the display unit, i.e. the touchscreen.

The user did not have to waste any time here on considering which beverage container matches which beverage and also did not risk making an incorrect association of a beverage with a beverage container. In brief, it was made possible for the user by the beverage maker to have beverages from a job list of beverages produced faster and with fewer errors.

In a preferred embodiment, the turntable has a signal generator, e.g. an optical signal generator, that signals to the user whether a beverage from the list has been completely prepared (e.g. display of information visualized in green such as a green illuminated field) or whether an additive (e.g. sugar) is stilled needed (e.g. display of information visualized in yellow such as a yellow illuminated field).

Example 2—Use of a Further Beverage Maker in Accordance with the Invention

This beverage maker in accordance with the invention is identical to the beverage maker of Example 1 with one exception: It has a separate operating unit in addition to the display unit (e.g. in the form of a touchscreen). The separate operating unit can likewise be configured as a touchscreen (i.e. can also be a display unit) and makes a selection possible for the user of at least one beverage or of a plurality of beverages to be prepared as part of a job list at a location that is far distant from the beverage maker (e.g. a cash register in a restaurant). The operating unit can be connected to the beverage maker, in particular to the control unit of the beverage maker, via a wired or wireless connection.

The job list prepared on the separate operating unit can be processed on the display unit, i.e. the user can mark beverages from the job list transmitted by the operating unit, can change their order, and can add and delete beverages.

The job list transmitted by the operating unit can here be automatically taken over on the turntable shown on the display unit. In other words, the beverage containers required for working through the job list can be automatically displayed on the respective sectors of the turntable in the order of their preparation (i.e. from the outer sector next to the dispensing sector up to the outer sector furthest remote from this outer sector) before the processing of the job list. Alternatively, the job list has not yet been taken over on the turntable that is shown by the display unit, i.e. user can manually carry out the takeover of the job list that was transmitted by the separate operating unit and can also makes changes to the job list. This can take place, for example, by a dragging and dropping of beverage symbols onto individual outer sectors of the turntable shown.

The control unit can be configured not to start any preparation, i.e. not to accept any preparation command, during this change by a user.

An optical visualization for the process of the preparation of the beverage can take place at the turntable in the sector of the beverage container of the beverage during the preparation of a beverage. Information visualized in red (e.g. a red illuminated field) can be displayed, for example. At that time at which the beverage has been completely prepared, the information visualized in red can change to information visualized in green (the illuminated field can e.g. now light up green). If the beverage has admittedly been completely prepared by the beverage maker, but still requires a (manual) addition by the user of the beverage maker (e.g. addition of sugar), information visualized in yellow (e.g. a yellow illuminated field) can be displayed instead of information visualized in green (e.g. a green illuminated field).

Provision can be made that a removal of a prepared beverage from the turntable of the beverage maker is confirmed by an entry of a user (e.g. via the display unit or via an operating unit) so that the display on the display unit is updated, i.e. the beverage container still shown for the removed beverage disappears, that is, is no longer shown by the display unit.

Alternatively, the turntable can comprise at least one sensor per sector (e.g. a weight sensor) that automatically transmits the information on the removal of a prepared beverage to the beverage maker. A manual entry of a user is then no longer necessary to update the representation of the turntable via the display unit.

An outer sector not occupied by a beverage container that should be occupied by a specific beverage container in accordance with a job list can show flashing information in color (e.g. a blue flashing illuminated field). As soon as a correct (i.e. a suitable or appropriate) beverage container has been placed on the outer sector of the turntable of the beverage maker, this outer sector can show non-flashing (i.e. continuously lit) information in color (e.g. a permanently lit blue information field).

The advantage of the visualization of this information on the turntable is that after a brief absence from the beverage maker, a user can recognize at a quick glance at the turntable which beverages have already been completely prepared and which have not or which beverages still require an addition (e.g. sugar). This makes the operation and the provision of the completed beverages considerably faster and simpler and freer or error.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

REFERENCE NUMERAL LIST

1: beverage maker;
2: beverage spout;

3: turntable;
4: display unit;
5: operating unit;
6: selection and representation of order numbers at the operating unit;
7: selection and representation of at least one beverage on the display unit;
7'': selection and representation of at least one beverage on the operating unit;
8: beverage container;
9: representation of the position number on the turntable, i.e. the position number of every sector of the turntable;
10: representation of the status of each sector of the turntable.

The invention claimed is:

1. A beverage maker comprising:
a unit for preparing at least one beverage;
a beverage spout that is fluidically connected to the unit;
a turntable having a plurality of sectors for placing down at least one beverage container, wherein the turntable has a dispensing sector arranged below the beverage spout and at least one outer sector;
a display unit; and
a control unit,
wherein
the display unit is configured to show the turntable and a current position of each of the plurality of sectors of the turntable, and the control unit is configured
to prompt the display unit to show a beverage container that is suitable for the at least one selected beverage in an outer sector of the turntable after a selection of at least one beverage at the beverage maker by a user; and
to prompt the turntable to rotate after a command to prepare the at least one selected beverage such that the outer sector adopts the position of the dispensing sector; to prompt the display unit to show the change of the position of the turntable and of the beverage container; and to prompt the beverage maker to prepare the at least one selected beverage by the unit and to dispense it via the beverage spout into the beverage container located in the dispensing sector.

2. The beverage maker of claim 1, wherein the control unit is configured to prompt the display unit to show a beverage container that is suitable for a respectively selected beverage in a respective one outer sector of the turntable after a selection of at least two beverages by a user, optionally after a selection up to a maximum number of beverages that can be shown in the outer sectors of the turntable.

3. The beverage maker of claim 2, wherein the control unit is configured to prompt the turntable to rotate such that the respective outer sectors consecutively adopt the position of the dispensing sector after a command to prepare the at least two selected beverages, optionally after a selection up to a maximum number of beverages that can be shown in the outer sectors of the turntable, and to prompt the display unit to show the changes to the positions of the beverage containers, and to prompt the beverage maker to prepare the selected beverages consecutively by the unit and to dispense them via the beverage spout into the respective beverage container located in the dispensing sector.

4. The beverage maker of claim 1, wherein the display unit and/or an operating unit connected to the beverage maker in a wireless or wired manner is/are configured to transmit a selection of at least one beverage by a user to the control unit, with the selection being made possible via i) a display of the at least one beverage by means of a representation selected from the group comprising text, symbol, pictogram, and combinations hereof; and/or
ii) touching the at least one beverage and/or dragging the at least one beverage into a selection zone of the display unit and/or operating unit, with the control unit preferably being configured to show the beverages next to one another in the selection zone on the display unit and/or operating unit in the event of a selection of a plurality of beverages, with the selection zone particularly preferably being a representation of the turntable and with the control unit very particularly preferably being configured to show the beverages on continuous outer sectors of the turntable located next to one another, in particular starting with the outer sector that is located directly next to the dispensing sector; and/or
iii) touching the at least one beverage and dragging the at least one beverage in a selection zone of the display unit and/or control panel to change the position of the at least one beverage in the selection zone, with the selection zone particularly preferably being a representation of the turntable and the control unit very particularly preferably being configured no longer to show the beverage in the first outer sector of the turntable after touching and dragging a beverage from a first outer sector of the turntable into a second outer sector of the turntable and to show it in the second outer sector of the turntable.

5. The beverage maker of claim 1, wherein the display unit and/or an operating unit connected to the beverage maker in a wireless or wired manner is/are configured
i) to accept an order number of at least one beverage by a user and to transmit it to the control unit; and/or
ii) to show a selection of at least one beverage by a user, preferably together with an order number associated with the at least one beverage, with the representation preferably taking place in a sector of the turntable in which the beverage container for the at least one beverage is located on the turntable of the beverage maker and/or in which the beverage container for the at least one beverage is shown on the turntable displayed on the display unit, with the control unit preferably being configured to prompt the representation of the order number on the turntable of the beverage maker and/or on the turntable displayed on the display unit; and/or
iii) to show the selected beverages in a list, preferably together with an order number associated with the beverages, in the event of a selection of a plurality of beverages by a user, with the list particularly preferably fixing the order of a preparation of the selected beverages and with the order in particular being variable by an entry of the user.

6. The beverage maker of claim 1, wherein the display unit and/or an operating unit connected to the beverage maker in a wireless or wired manner is/are configured to display a status of the dispensing sector and/or of at least one outer sector, preferably via a representation selected from the group comprising text, symbol, pictogram, color, and combinations hereof, with the status of the reference sector and/or at least one outer sector particularly preferably being selected from the group comprising
i) required, but missing beverage container;
ii) incorrect beverage container;
iii) correct and empty beverage container in which the preparation has not yet started;

iv) correct beverage container in which the preparation has started;
v) correct beverage container filled with beverage and still incomplete beverage preparation; and
vi) correct beverage container filled with beverage and completed beverage preparation.

7. The beverage maker of claim 1, wherein the display unit and/or an operating unit connected to the beverage maker in a wireless or wired manner is/are configured to accept a command to prepare the at least one selected beverage by a user, preferably by touching a representation, particularly preferably via a representation selected from the group comprising text, symbol, pictogram, and combinations hereof, and to transmit the command to prepare the at least one selected beverage to the control unit.

8. The beverage maker of claim 1, wherein the display unit and/or an operating unit connected to the beverage maker in a wireless or wired manner is/are configured to enable an entry by a user, to no longer show a beverage container shown in the outer sector or dispensing sector via the display unit and/or operating unit, and to transmit a made entry to the control unit, with the entry preferably being made possible via a representation, in particular a representation selected from the group comprising text, symbol, pictogram, and combinations hereof.

9. The beverage maker of claim 1, wherein the sectors of the turntable comprise at least one sensor for detecting a placed down beverage container and the at least one sensor has a communicative connection to the control unit, with
  i) the at least one sensor preferably being selected from the group comprising a weight sensor, optical sensor, magnetic sensor, electromagnetic sensor, imaging sensor, and combinations hereof; and/or
  ii) the control unit preferably being configured, when the at least one sensor does not detect any beverage container or detects an unsuitable beverage container in the outer sector, also not to prompt the turntable to rotate after receipt of a command to prepare the at least one selected beverage such that the outer sector adopts the position of the dispensing sensor; and/or
  iii) the control unit preferably being configured, when the at least one sector detects a suitable beverage container in the outer sector, to prompt the turntable to rotate after the receipt of a command to prepare the at least one selected beverage such that the outer sector adopts the position of the dispensing sector, optionally in the absence of a command entered by a user to prepare the at least one selected beverage.

10. The beverage maker of claim 1, wherein the sectors of the turntable
  i) have a grate that is suitable for placing down the beverage containers, with a drip tray preferably being arranged below the grate; and/or
  ii) have a sector display unit that is configured to display information on the respective sector, preferably via a representation selected from the group comprising text, symbol, pictogram, color, and combinations hereof, with the displayed information in particular corresponding to at least one piece of information of a respective sector that is displayed via the display unit of the beverage maker and/or of an operating unit connected to the beverage maker in a wireless or wired manner.

11. The beverage maker of claim 1, wherein the unit for preparing at least one beverage is a unit for preparing at least one beverage selected from the group comprising coffee, tea, milk, milk froth, and combinations hereof, with the unit for preparing at least one beverage preferably being selected from the group comprising brewing unit, milk frother, and combinations hereof.

12. The beverage maker of claim 1, wherein the beverage spout is movable in the direction of the turntable.

13. The beverage maker of claim 1, wherein the display unit and/or an operating unit connected to the beverage maker in a wireless or wired manner comprise(s) or consist(s) of a touch-sensitive screen.

\* \* \* \* \*